(12) United States Patent
Doveri

(10) Patent No.: US 6,679,054 B2
(45) Date of Patent: Jan. 20, 2004

(54) ELECTRO-HYDRAULIC ACTUATOR OF A MOTORCYCLE STAND

(76) Inventor: Marco Doveri, 18, Via XXIV Maggio, 56025, Pontedera (Pisa) (IT)

( * ) Notice: Subject to any disclaimer, the term of this patent is extended or adjusted under 35 U.S.C. 154(b) by 10 days.

(21) Appl. No.: 10/136,693

(22) Filed: Apr. 30, 2002

(65) Prior Publication Data

US 2002/0157393 A1 Oct. 31, 2002

(30) Foreign Application Priority Data

Apr. 30, 2001 (EP) .......................................... 01110636

(51) Int. Cl.$^7$ .............................................. F16D 31/02
(52) U.S. Cl. ...................... 60/474; 280/301; 280/764.1
(58) Field of Search ........................... 60/474; 91/442; 180/218; 280/301, 764.1

(56) References Cited

U.S. PATENT DOCUMENTS

| 3,136,226 A | 6/1964 | Gratzmuller ................. 91/442 |
| 3,980,150 A | 9/1976 | Gigli ........................... 180/209 |
| 4,223,906 A | 9/1980 | Gratza ......................... 280/301 |
| 5,029,894 A | 7/1991 | Willman ...................... 280/301 |
| 5,118,126 A | 6/1992 | Yaple ........................... 280/293 |

FOREIGN PATENT DOCUMENTS

| DE | 2913429 A1 | 10/1980 |
| FR | 2678573 | 1/1993 |
| GB | 438559 | 1/1935 | ................. 60/474 |

Primary Examiner—F. Daniel Lopez
(74) Attorney, Agent, or Firm—The Bilicki Law Firm P.C.

(57) ABSTRACT

An actuating device (1) for the rotation of a stand (4) of a vehicle, such as a motorcycle or scooter, between a standing position and a rest position, and allowing also the reverse maneuver in order to rotate the stand from the position of vehicle on the stand up to that in which the vehicle lowers spontaneously. At least one hydraulic actuator (1) is provided that operates, between a first and a second position, an actuating member (7) or piston rod that engages with the stand (4) up to bringing it respectively from the rest position to the standing position. A flow control hydraulic circuit delivers pressurized liquid to the actuator (1) for moving the actuating member (7) from the first to the second position, and allows the back stroke of the actuating member (7) to the first position when the flow of the liquid ceases, whereby the stand (4) can be brought back to said rest position independently from the actuating member (7). When the stand is in the standing position and the actuating member (7) has turned back to the first position, means are provided operated by the actuator (1) for starting the return rotation of the stand (4) from the standing position to the rest position up to a point wherein it is not necessary to bear the weight of the vehicle for carrying out the rotation. The actuator is particularly suitable for handling a motorcycle stand, with the advantages that in case of lack of pressure in the hydraulic circuit the stand is free in its movement towards the rest position in which it remains as if the device does not exist. Furthermore, the actuator makes easier the lowering step of the vehicle from the stand, even if the lowering from the stand is possible also in traditional way.

7 Claims, 5 Drawing Sheets

ELECTRO-HYDRAULIC ACTUATOR OF A MOTORCYCLE STAND

FIELD OF THE INVENTION

The subject of the present invention relates to the field of motorized vehicles, in particular to an actuator device for motorcycle stands, or stands for other vehicles, such as scooters.

More particularly, the invention relates to a improved actuator device that, in addition to lifting the vehicle on the stand, allows the driver to operate the stand in a manner opposite to that of lifting, thus also making easier the maneuver of lowering the vehicle from the stand.

BACKGROUND OF THE INVENTION

In motorcycles and in scooters, the maneuver of lifting the vehicle on the stand always requires a certain physical force and is often tough.

An actuator device with an electro-hydraulic drive system is known that solves the problem, as described in U.S. patent application Ser. No. 09/664,251 in the name of the same applicant. This system is based on a flow control valve that operates an actuator by emptying the actuator at the end of the maneuver or in case of interruption of the lifting maneuver.

In big motorcycles and in some types of scooters, where the driver is tied by special safety belts, the driver needs a way to make easier the lowering of the vehicle from the stand. This need is felt much more in the case of sloped parking; in this case, in fact, the effort needed for lowering the vehicle from the stand is much greater.

Typically, the moment of the weight of the vehicle with respect to the stand's axis of articulation is approximately zero degrees at the dead point before the vehicle reaches its steady position on the stand. For this reason, when lowering the vehicle from the stand, it is necessary to have a short movement for reaching the dead point after which the vehicle lowers spontaneously.

SUMMARY OF THE INVENTION

The object of the present invention is to provide a device for actuating a motorcycle stand, or stands for other vehicles such as scooters, that is driven electro-hydraulically and operates the stand for lifting. Furthermore, the object of the present invention is to provide a device that makes easier the step of lowering the motorcycle, or other vehicle, from the stand, even allowing a normal step of lowering the stand.

It is a particular object of the present invention to provide an actuator device that operates the stand throughout the lifting maneuver and also allows the reverse maneuver in order to rotate the stand from its position when the motorcycle, or other vehicle, is on the stand to when the vehicle lowers spontaneously.

It is a particular object of the present invention to provide an actuator device that allows the stand to move freely between the position of the motorcycle, or other vehicle, on the stand and the rest position of the vehicle off the stand independent from the actuator device, providing substantially the same functionality of a traditional stand.

A further object of the present invention is to provide an electro-hydraulic circuit for motorcycle stands that can be used for said actuator device.

These and other objects are achieved by the actuator device as defined in the attached claims.

According to the invention, a device for actuating the rotation of a motorcycle stand comprises at least a hydraulic actuator operating an actuating member between a first rest position and a second standing position, by a hydraulic flow control circuit, so that the motorcycle stand is in any case moved from the standing position to the rest position independently from the actuating member. The characteristic of the device is that when the motorcycle stand is in the second standing position, and the actuating member is then turned back to the first rest position, means are provided by the actuator for starting the return rotation of the stand from the second standing position to the first rest position up to a point wherein it is not necessary to bear the weight of the vehicle for carrying out the rotation.

Preferably, the actuator device is a hydraulic cylinder comprising a piston and the actuating member is a piston rod sliding in the motorcycle stand and connected to the piston, the piston rod moving between an extended position corresponding to the first rest position to a retracted second standing position, whereby the motorcycle stand is brought to the second standing position by pulling the piston rod through an abutting end of the latter.

Advantageously, the means for starting the return rotation of the stand comprise a pushing element in the hydraulic cylinder having a tubular portion sliding coaxially on the piston rod and having an end external to the hydraulic cylinder suitable for urging a lever integral to the stand, the piston pushing the motorcycle stand independently from the piston rod by pressure against the pushing element.

The pushing element preferably has a head suitable for urging the piston and resilient means set between the head and the bottom of the hydraulic cylinder that oppose the movement of the tubular portion towards the motorcycle stand.

Alternatively, the actuator device can be a hydraulic cylinder comprising a piston and the actuating member is a piston rod sliding in the motorcycle stand and connected to the piston, the piston rod moving between an extended position corresponding to the second standing position to a retracted first rest position, whereby the motorcycle stand is brought to the standing position by the piston rod through a first abutment that pushes the motorcycle stand.

The means for starting the return rotation of the motorcycle stand comprise a second abutment provided at the end of the piston rod distanced by the first abutment, whereby the piston rod pushes by the first abutment causing the motorcycle stand to move from the first rest position to the second standing position and pulls by the second abutment causing the back stroke of the motorcycle stand towards the first rest position, the distance between the first and second abutment allowing the motorcycle stand to complete the movement of back stroke to the first rest position independently by the piston.

DESCRIPTION OF THE DRAWINGS

Further characteristics and the advantages of the actuator device and of the hydraulic valve according to the present invention will be made clearer with the following description of an embodiment thereof, which exemplifies but does not limit the invention, with reference to attached drawings wherein.

DETAILED DESCRIPTION OF THE INVENTION

Figure 1:
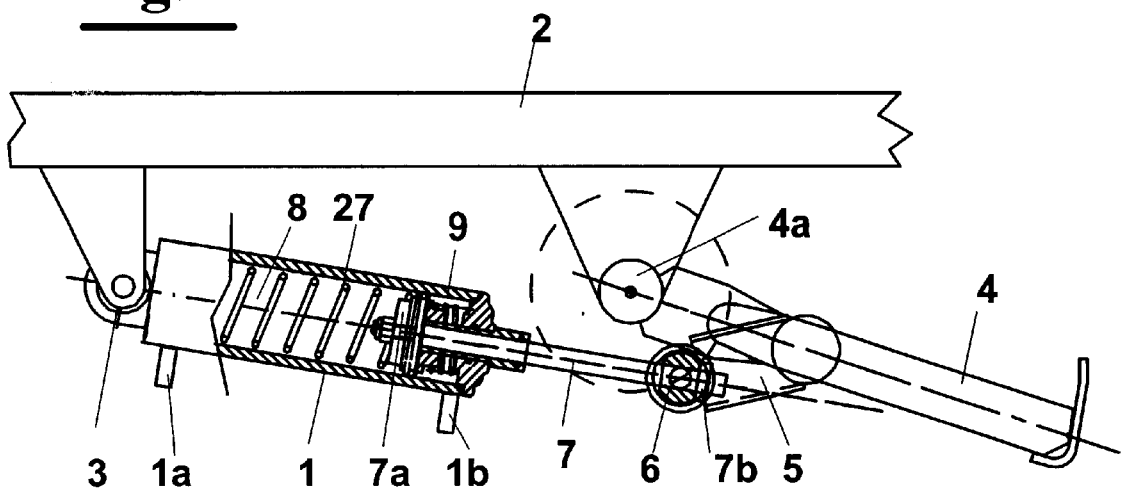
FIG. 1 depicts an example of an application to a motorcycle of an actuator device according to the invention.

With reference to FIG. 1, according to the present invention, actuating cylinder 1 is connected at a first end to frame 2 of a motorcycle through hinge 3, and at a second end to motorcycle stand 4. One of ordinary skill in the art will readily appreciate that the present invention can be used in connection with other types of vehicles, such as scooters.

More precisely, in the present example, fork lever 5 is integral to motorcycle stand 4 and is angled with respect to the plane of motorcycle stand 4, in which a cylindrical pivot 6 can rotate. The actuating cylinder 1 is associated to piston rod 7 sliding in cylindrical pivot 6. Piston rod 7 has at the respective ends piston 7a sliding in actuating cylinder 1 and abutment head 7b that stops the stroke of piston rod 7 against pivot 6.

Figure 2:
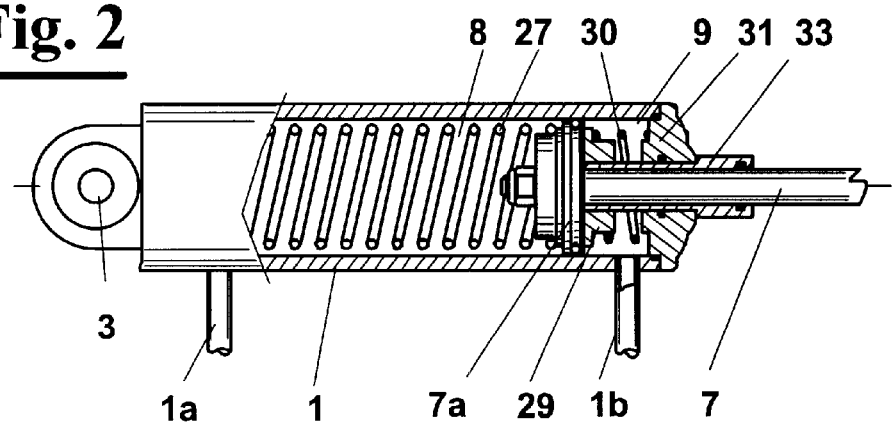
FIG. 2 depicts an actuator device according to the invention for a motorcycle stand with the piston rod pulling in the direct phase of lifting.

With reference to FIG. 2, piston 7a separates chamber 8 and chamber 9 in actuating cylinder 1. Chamber 8 and chamber 9 have a first port 1a and a second port 1b, respectively, which allow for the passage of inlet oil from, or outlet oil towards, a hydraulic circuit shown hereinafter. In chamber 8, a first spring 27 is present that pushes piston 7a towards second port 1b, as well as pushes piston rod 7 out from actuating cylinder 1. In chamber 9 is present instead a plate 29 connected to a bush 33 sealed, but free to slide, in the end wall 31 of actuating cylinder 1. This allows piston rod 7, also sealed, to slide in and out of actuating cylinder 1 without oil dripping out. The movement of plate 29 towards the end wall 31 is biased by a second spring 30.

Figure 3:
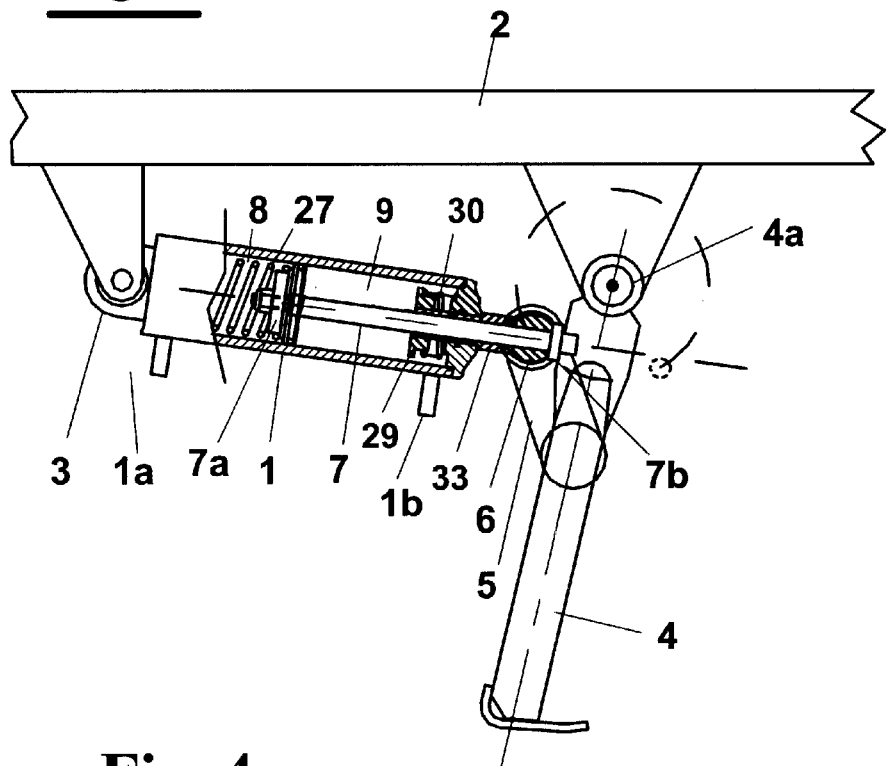
FIGS. 3 and 4 show two operative positions of the motorcycle stand of FIG. 1.

For lowering motorcycle stand 4 from the first rest position of FIG. 1 to the second standing position of a lifted vehicle as shown in FIG. 3, the same system is used as described in U.S. patent application Ser. No. 09/664,251 in the name of the same applicant.

In summary, head 7b abuts against pivot 6 when the pressure of the oil delivered into chamber 9 through second port 1b moves piston 7a, as well as piston rod 7, towards first port 1a, so that piston rod 7, through head 7b and pivot 6, pulls fork lever 5 up to full rotation of the motorcycle stand 4 with respect to vehicle frame 2.

Figure 4:
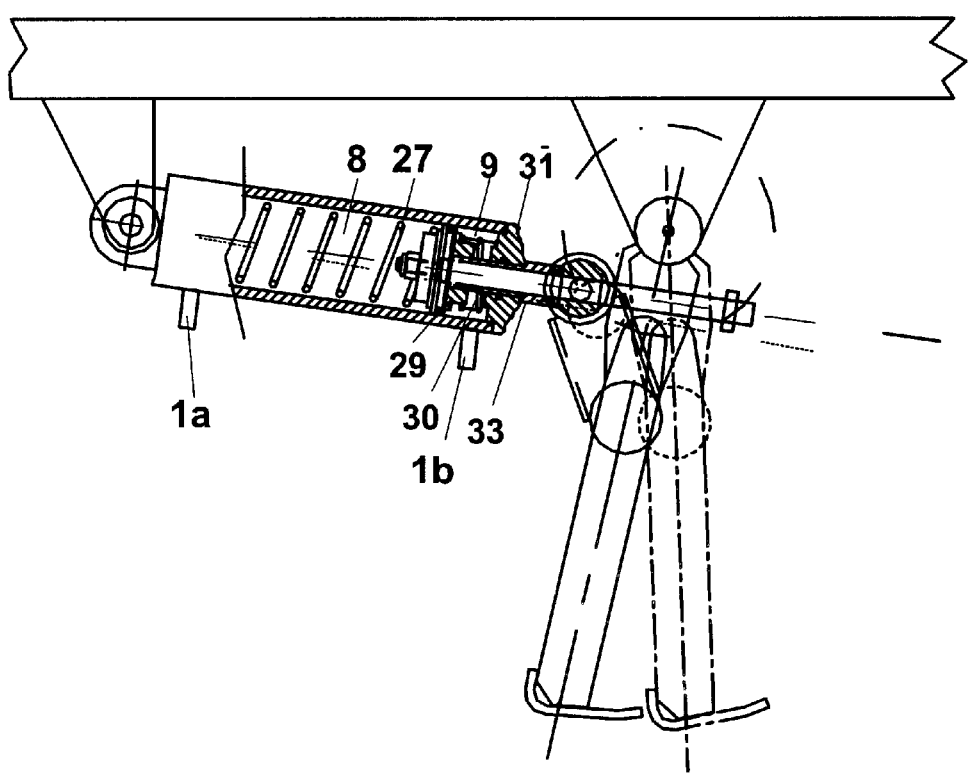

When the flow of oil ceases, the hydraulic circuit, in the way hereinafter shown in FIG. 5, automatically discharges the oil and allows piston 7a, pushed by spring 27 present in chamber 8, to move back to the starting position, as shown in FIG. 4. In this case, motorcycle stand 4 is independent from the actuator and the motorcycle can be lowered like motorcycles not equipped with this device.

According to the present invention, starting from the position of FIG. 4 indicated with a continuous line, when the pressure of the oil delivered into chamber 8 through first port 1a and the oil in chamber 9 is discharged through second port 1b, piston 7a pushes, by plate 29, bush 33 against fork lever 5 and then moves motorcycle stand 4 away from its second standing position of a lifted vehicle, as indicated with a continuous line. In particular, the stroke of bush 33 allows motorcycle stand 4 to move beyond the dead point, indicated with a dotted line in FIG. 4, after that the vehicle frame 2 lowers spontaneously. When the flow rate of oil ceases, the biasing spring 30 returns bush 33 to the first resting position shown in FIG. 1, independently from the movement of the stand.

Biasing spring 30, not necessarily present, allows however to keep bush 33 in chamber 9 and, therefore, protected during the run of the vehicle.

Figure 5:
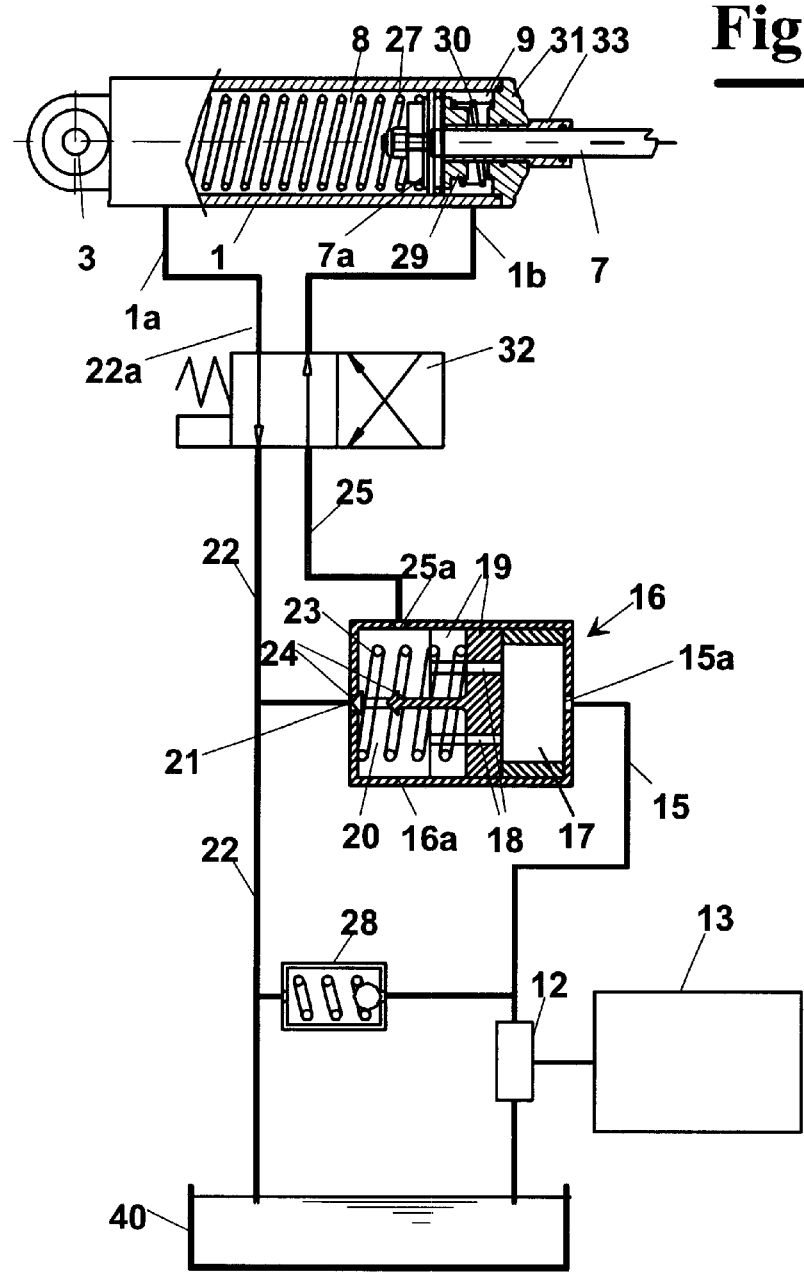
FIG. 5 illustrates a view of the hydraulic actuating circuit of the actuator device of FIG. 1.

With reference to FIG. 5, a possible hydraulic circuit comprises a positive displacement pump 12 which, operated by an electrical motor 13, delivers pressurized oil through delivery duct 15, into flow control valve 16.

Flow control valve 16 comprises, as shown in U.S. patent application Ser. No. 09/664,251, chamber 17 and chamber 20, which are separated by piston 19. Portions of piston 19 form axial through holes 18, which fluidly connect chamber 17 and chamber 20. Piston 19 is pushed towards chamber 17 by spring 23 and has needle 24, which is suitable for engaging discharge port 21 in order to close discharge port 21. Chamber 20 has discharge port 21 connected with discharge duct 22 for discharging reservoir 40. Chamber 20 also has an outlet port 25a and outlet duct 25, through which pressurized oil is delivered towards an electro-distributor 32. Electro-distributor 32 has two positions for allowing pressurized oil to be delivered to chamber 9 and chamber 8 of actuating cylinder 1, in order to carry out the lifting and lowering movements. Preferably, in the lifting maneuver, electro-distributor 32 is not triggered and operates like in U.S. patent application Ser. No. 09/664,251. For the lowering maneuver, however, electro-distributor 32 is triggered when starting the pump, delivering pressurized oil into chamber 8 and discharging chamber 9.

As described in U.S. patent application Ser. No. 09/664,251, air cannot be put in chamber 8 or chamber 9 of actuating cylinder 1, therefore reservoir 40 is preferable since chamber 9 and chamber 8 are alternatively pressurized for lifting and for lowering motorcycle stand 4.

In both positions of electro-distributor 32, at the start of motor 13, pump 12 delivers pressurized oil into chamber 17 through delivery duct 15. The oil passes through piston holes 18 of piston 19 to chamber 20 of flow control valve 16. Then, the oil passes through discharge port 21 and back to reservoir 40 through discharge duct 22. The discharge flow automatically ceases, however, due to the pressure loss which the flow of oil is subject to when crossing piston holes 18 of piston 19 which creates the same force on piston 7a which, by overcoming the reaction of spring 23, moves piston 19 towards chamber 20 so that needle 24 can close discharge port 21.

When flow through discharge duct 22 is discontinued, the pressurized oil is necessarily delivered, through outlet port 25a of chamber 20 and through side outlet duct 25 to electro-distributor 32. As shown in FIG. 5, from the valve of electro-distributor 32, the pressurized oil is delivered into chamber 9 of actuating cylinder 1, therefore pushing piston 7a and piston rod 7 towards chamber 8 and lifting the vehicle frame 2 as shown in FIG. 3. In the triggered position of the valve of electro-distributor 32, instead, the pressurized oil is delivered to chamber 8 of actuating cylinder 1, thus pushing piston 7a against plate 29 and lowering the vehicle from the stand, as shown in FIG. 4.

In both cases, while piston 7a is moving, the pressure loss of oil towards chamber 9 of actuating cylinder 1 through piston holes 18 continues to keep discharge port 21 closed by needle 24, and the pressure of the oil that acts on the head of needle 24 cooperates with this action.

When motor 13 stops, either because piston 7a is at the end of its stroke or because the user interrupts the maneuver, the flow of oil through side outlet duct 25 ceases and spring 23 quickly returns piston 19 back, freeing discharge port 21 from needle 24. Contemporaneously, spring 27 returns piston 7a and piston rod 7 gradually back again to the position of FIG. 3, when motorcycle stand 4 is in the steady position and holds the vehicle frame 2 standing. If the action of lifting is discontinued before the stand reaches the dead point, instead, the weight of the vehicle brings the stand spontaneously to the position of FIG. 1.

Between discharge duct 22 and delivery duct 15 is advantageously provided a safety valve 28 adjusted to a maximum operating pressure.

Figure 6:
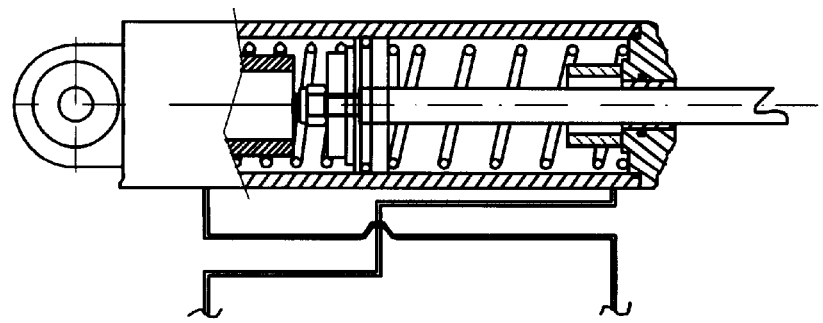
FIG. 6 is a pushing actuator device that can be used alternatively to the actuator device of FIG. 2 with the same hydraulic circuit of FIG. 5, by exchanging the inlet and emptying outlet of the oil.

Notwithstanding the reference made to an actuating cylinder 1 that moves motorcycle stand 4 by pulling piston rod 7, it is obviously possible to provide in a way completely equivalent an actuating cylinder 1 that works by pushing piston rod 7 for moving motorcycle stand 4 from the first rest position to the lifting position and vice versa. As shown in FIG. 6, in fact, it is possible to use a pushing actuator with the same hydraulic circuit of FIG. 5 or 6, by reversing the oil inlet and discharge ducts.

Figure 7:
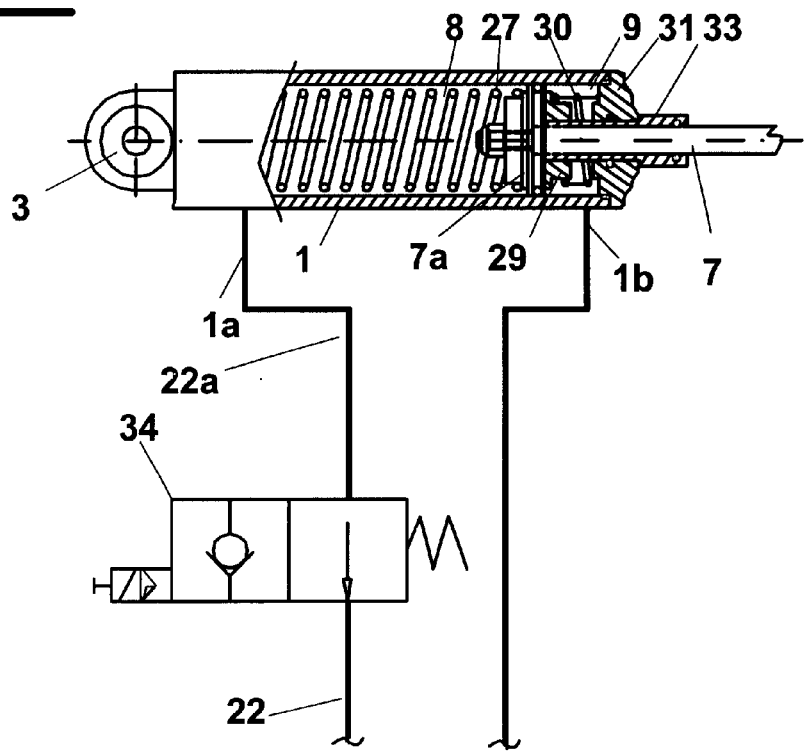
FIG. 7 is an embodiment of the circuit of FIG. 5 applied to the motorcycle stand of FIG. 1.

Another possible hydraulic layout is shown in FIG. 7. It is similar to that of FIG. 5, with the difference that side outlet duct 25 that leads to second port 1b is always free, whereas the duct 22a that comes from first port 1a and leads to the discharge duct 22, is controlled by electro-valve 34. In this case, the maneuver of lifting is not changed with respect to the previous case. For lowering, however, electro-valve 34 is triggered and, by delivering pressurized oil into chamber 9, piston 7a cannot move (because chamber 8 is closed) and plate 29 with bush 33, behaving as a sinking piston, pushes pivot 6 and rotates stand 4 beyond the dead point.

The advantage of this layout is much simpler hydraulics, but the effective cross section area and the load available for lowering is much lower, since it is equal to the area of the circular corona of the cross section of bush 33.

Figure 8:
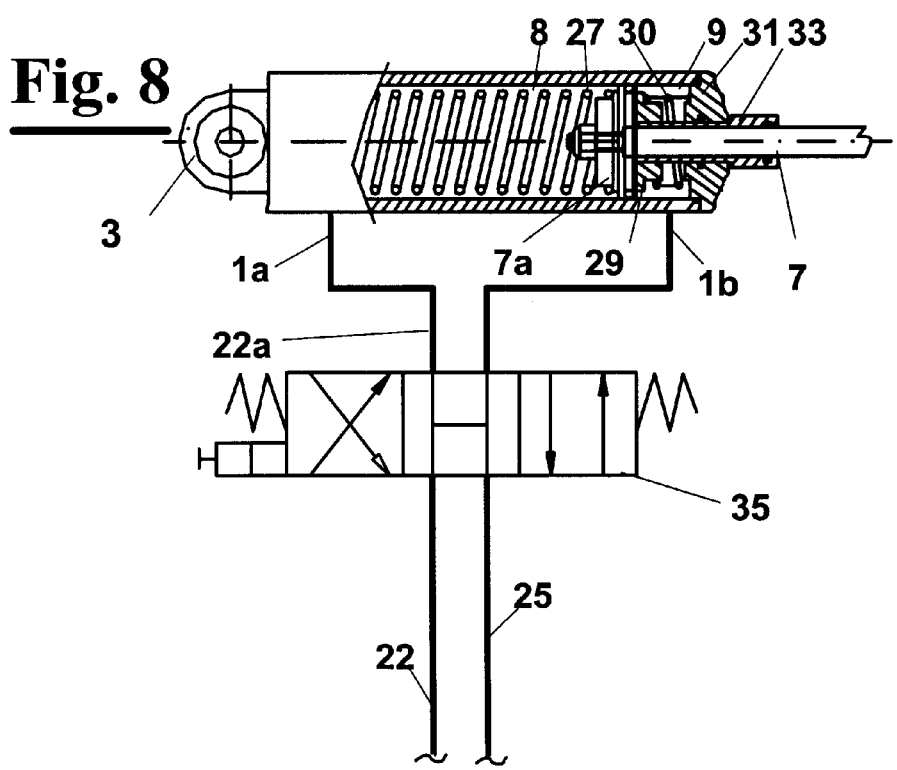
FIG. 8 is an embodiment of the circuit of FIG. 5 applied to the motorcycle stand of FIG. 1 or FIG. 6.

Another possible hydraulic layout, suitable always for actuating in the way of FIGS. 1 to 4, is shown in FIG. 8. Electro-distributor 35 is a type of electro-distributor with three positions. In particular, both delivery duct 25 of the pump and first port 1a and second port 1b of actuating cylinder 1 discharge reservoir 40 by discharge duct 22 when electro-distributor 35 is not triggered. In this situation, motorcycle stand 4 works as if the actuating cylinder 1 was not present and it can be raised or lowered in a traditional way. For the lifting or the lowering steps, electro-distributor 35 is triggered in the two possible directions putting the hydraulic circuit in the conditions already described according to FIG. 5.

Figure 9A:
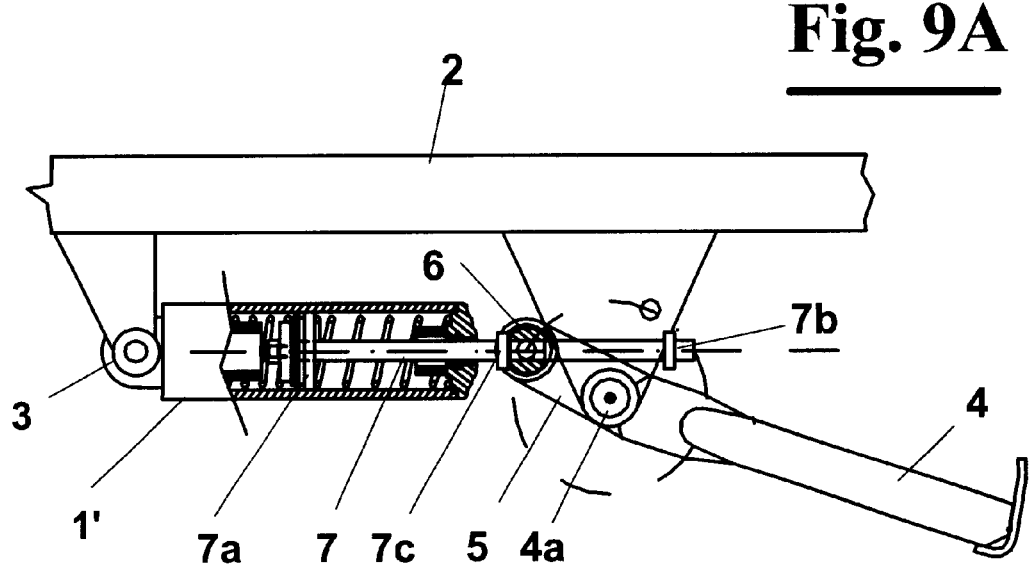
FIGS. 9A and 9B show two operative positions of an embodiment of the motorcycle stand of FIG. 6.
Figure 9B:
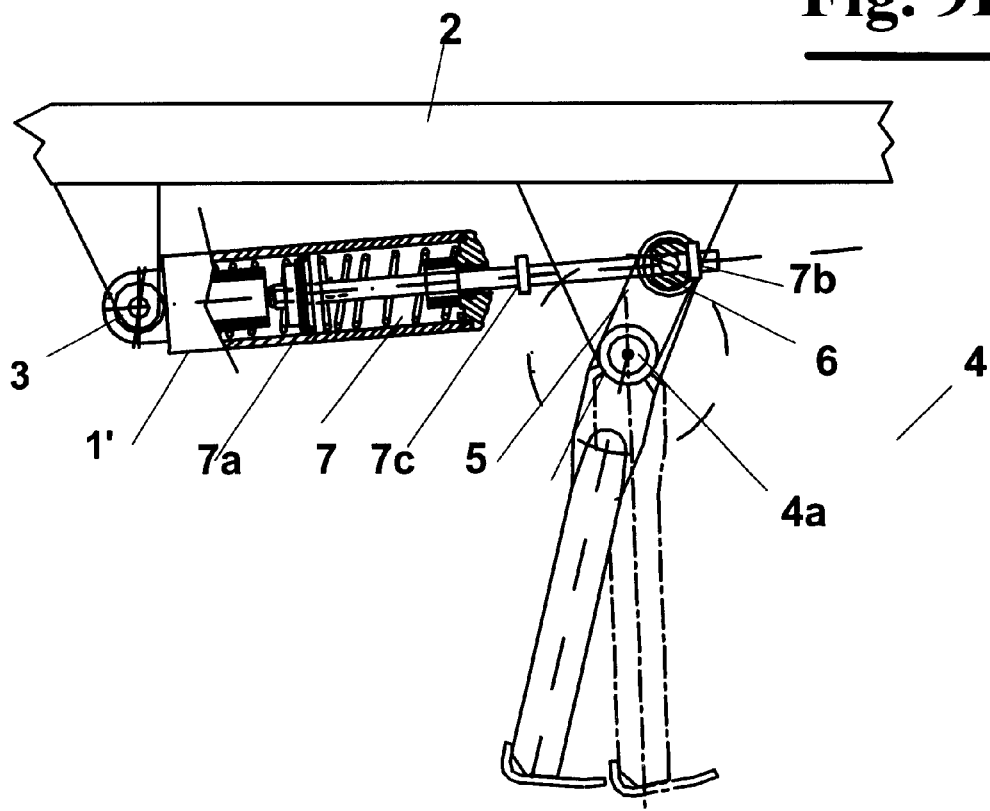

As shown in FIGS. 9A and 9B, a diagram of stand 4 suitable to a pushing actuating cylinder when lifting, as that of FIG. 6, has fork lever 5 at opposite sides of stand 4 with respect to hinge 4a. In this case, actuating cylinder 1' is provided that for lifting the vehicle frame 2 must push instead of pulling. In this case, the mechanical layout for lowering of the vehicle from stand 4 provides on piston rod 7 both a pawl 7b and a pawl 7c. This way, referring to FIG. 8, when lifting piston rod 7 pushes stand 4 by pawl 7c, whereas for lowering piston rod 7 pulls stand 4 by pawl 7b for small rotation up to the dead point of FIG. 9. The hydraulic circuit for this type of layout can be that of FIG. 5, by reversing the links to first port 1a and second port 1b, as shown in FIG. 7.

Notwithstanding the reference to a stand with a front actuator with respect to the direction of running with respect to the stand and in a position substantially horizontal, it is also possible that, remaining always within the scope of the present invention, the actuator is arranged rearward with respect to the stand or arranged vertically or obliquely with respect to the stand. In such different situations, the position of fastening of pin 6 can be changed, and pulling or pushing actuators can be used, in a way obvious for a man of the art.

The foregoing description of a specific embodiment will so fully reveal the invention according to the conceptual point of view, so that others, by applying current knowledge, will be able to modify and/or adapt for various applications such an embodiment without further research and without parting from the invention, and it is therefore to be understood that such adaptations and modifications will have to be considered as equivalent to the specific embodiment. The means and the materials to realise the different functions described herein could have a different nature without, for this reason, departing from the field of the invention. It is to be understood that the phraseology or terminology employed herein is for the purpose of description and not of limitation.

What is claimed is:

1. An actuator device for the rotation of a vehicle stand, said stand (4) being pivotally connected (4b) to said vehicle frame (2) between a first resting position and a second standing position, comprising at least one hydraulic actuator (1) operating an actuating member (7) between a first and a second position, said actuating member (7) when passing from said first to said second position engaging with said stand (4) up to bringing it respectively from the rest position to the standing position, a flow control hydraulic circuit being provided that delivers pressurized liquid to said hydraulic actuator (1) for moving said actuating member (7) from said first to said second position and allows the back stroke of said actuating member (7) to said first position when the flow of said liquid ceases, whereby said stand (4) can be brought back to said rest position independently from said actuating member (7), wherein, when said stand (4) is in said standing position and said actuating member (7) has turned back to said first position, means are provided by said actuator (1) for starting the return rotation of said stand (4) from said standing position to said rest position up to a point wherein it is not necessary bear the weight of the vehicle for carrying out the rotation.

2. An actuator device according to claim 1, wherein said actuator is a hydraulic cylinder (1) comprising a piston (7a) and said actuating member is a piston rod (7) sliding in said stand and connected to said piston, said piston rod moving between an extended position corresponding to said first position to a retracted position, whereby said stand (4) is brought to said standing position by pulling through said piston rod (7a) by an abutting end of the latter (7b).

3. An actuator device according to claim 2, wherein said means for starting the return rotation of said stand (4) comprise a pushing element (29) in said cylinder having a tubular portion (33) sliding coaxially on said piston rod (7) and having an end external to said cylinder suitable for urging a lever (5) integral to said stand, said piston (7a) pushing said stand independently from said piston rod by pressure against said pushing element (29).

4. An actuator device according to claim 3, wherein said pushing element has a head (29) suitable for urging said piston (7a) and resilient means set between said head and the bottom (31) of said cylinder (1) that oppose (29) the movement of said tubular portion (33) towards said stand.

5. Am actuator device according to claim 1, wherein said actuator is a hydraulic cylinder (1) comprising a piston (7a) and said actuating member is a piston rod (7) sliding in said stand and connected to said piston (7a), said piston rod (7) moving between an extended position corresponding to said second position to a retracted position, whereby said stand is brought to said standing position pushed by said piston rod through a first abutment that pushes said stand.

6. An actuator device according to claim 5, wherein said means for starting the return rotation of said stand (4) comprise a second abutment provided at the end of said piston rod (7) distanced from said first abutment, whereby said piston rod pushes by said first abutment causing the stand to move from said rest position to the standing position and pulls by said second abutment causing the back stroke of said stand towards said rest position, the distance between said first and second abutment allowing the stand to complete the movement of back stroke to said rest position independently from said piston.

7. An actuator device according to claim 1, wherein said flow control hydraulic circuit comprises a flow control valve (16) connected with a first port (1a) and a second port (1b) of said hydraulic actuator (1), said means for starting the back rotation of said stand comprising an electro-distributor (32) associated to said flow control hydraulic circuit.

* * * * *